UNITED STATES PATENT OFFICE.

ST. JULIEN RAVENEL, OF CHARLESTON, SOUTH CAROLINA.

IMPROVEMENT IN ARTIFICIAL STONE.

Specification forming part of Letters Patent No. 15,526, dated August 12, 1856.

*To all whom it may concern:*

Be it known that I, ST. JULIEN RAVENEL, of Charleston, in the State of South Carolina, have invented or produced an artificial solid composition of earthy matter, which for all useful purposes is a good substitute for stone, marble, or brick; and I do hereby declare that the following is a full and exact description of the method of producing the same.

A kind of marl which I find in South Carolina, (composed of carbonate of lime, clay, and water in about the following proportions, viz: carbonate of lime, seventy-six parts; clay, eight parts; water, sixteen parts,) I take and pulverize, and then thoroughly incorporate the same with about one-half its weight of slaked lime, making a compound consisting of about sixty-six and two-thirds per cent. of pulverized marl and thirty-three and one-third per cent. of slaked lime. This compound I moisten sufficiently to give it adhesiveness, and then place it in molds and subject it to a sufficient degree of pressure to unite the particles and enable the blocks thus formed to retain their shape after they are removed from the molds. The said blocks of composition after a few days' exposure to the influence of the atmosphere will become hard enough to be used as a substitute for stone or marble for building purposes.

The aforesaid composition, it is believed, may be placed in the molds in a dry state, or nearly so, provided a sufficiently high degree of power be employed in the pressing operation to cause an adhesion of the particles of the composition in that state.

What I claim as my invention, and desire to secure by Letters Patent, is—

The within-described substitute for stone, marble, or brick, produced substantially in the manner herein set forth.

The above specification of my artificial solid composition of earthy matter signed and witnessed this 20th day of June, 1856.

ST. JULIEN RAVENEL.

Witnesses:
   Z. C. ROBBINS,
   WILLIAM A. CLARK.